US009999282B2

(12) United States Patent
Schinasi

(10) Patent No.: US 9,999,282 B2
(45) Date of Patent: Jun. 19, 2018

(54) METHOD FOR PREPARING PIECES OF FABRIC; PIECES AND BAG DERIVED FROM APPLICATION OF THE METHOD

(71) Applicant: CODEFINE S.A., Lausanne (CH)

(72) Inventor: Piero Schinasi, Epalinges (CH)

(73) Assignee: Codefine S.A., Lausanne (CH)

( * ) Notice: Subject to any disclaimer, the term of this patent is extended or adjusted under 35 U.S.C. 154(b) by 0 days. days.

(21) Appl. No.: 14/440,579

(22) PCT Filed: Nov. 5, 2013

(86) PCT No.: PCT/IB2013/059914
§ 371 (c)(1),
(2) Date: May 4, 2015

(87) PCT Pub. No.: WO2014/068545
PCT Pub. Date: May 8, 2014

(65) Prior Publication Data
US 2015/0272289 A1 Oct. 1, 2015

(30) Foreign Application Priority Data
Nov. 5, 2012 (CH) ........................................ 2252/12

(51) Int. Cl.
*A45C 7/00* (2006.01)
*A45C 3/04* (2006.01)
(Continued)

(52) U.S. Cl.
CPC .................. *A45C 7/00* (2013.01); *A45C 3/04* (2013.01); *A45C 5/02* (2013.01); *A45C 5/143* (2013.01);
(Continued)

(58) Field of Classification Search
CPC .... A45C 7/00; A45C 3/04; A45C 5/02; A45C 5/143; A45C 7/0036; A45C 2007/0004; B32B 5/26; B32B 7/02; B32B 37/12; B32B 37/18; B32B 2250/03; B32B 2262/0253; B32B 2439/06; B32B 2553/026; B65D 33/007; B65D 81/03; B65D 33/02;
(Continued)

(56) References Cited

U.S. PATENT DOCUMENTS 2,228,066 A * 1/1941 Tashbook .................. A45C 3/04
190/18 A
2,667,198 A * 1/1954 Klein ...................... A45C 11/20
383/107
(Continued)

FOREIGN PATENT DOCUMENTS

CN 1150784 A 5/1997
EP 0691286 B1 1/1996
(Continued)

*Primary Examiner* — Tri Mai
(74) *Attorney, Agent, or Firm* — Volpe & Koenig, P.C.

(57) ABSTRACT

Bag having at least one of its sides produced from a piece of fabric secured to a piece of bubble wrap; securing being achieved by coating one face of the piece of fabric with adhesive then applying a piece of bubble wrap, either via its bumpy face or via its smooth face. Attachment is performed by sewing, laminating or bonding a second piece of fabric to the first piece of fabric so as to sandwich a piece of bubble wrap between these two pieces of fabric.

4 Claims, 3 Drawing Sheets

(51) Int. Cl.
*A45C 5/02* (2006.01)
*A45C 5/14* (2006.01)
*B65D 81/03* (2006.01)
*B65D 33/00* (2006.01)
*B65D 33/02* (2006.01)
*B65D 81/38* (2006.01)
*B32B 5/26* (2006.01)
*B32B 7/02* (2006.01)
*B32B 37/12* (2006.01)
*B32B 37/18* (2006.01)
*D05B 13/00* (2006.01)

(52) U.S. Cl.
CPC .............. *A45C 7/0036* (2013.01); *B32B 5/26* (2013.01); *B32B 7/02* (2013.01); *B32B 37/12* (2013.01); *B32B 37/18* (2013.01); *B65D 33/007* (2013.01); *B65D 33/02* (2013.01); *B65D 81/03* (2013.01); *B65D 81/3897* (2013.01); *D05B 13/00* (2013.01); *A45C 2007/0004* (2013.01); *B32B 2250/03* (2013.01); *B32B 2262/0253* (2013.01); *B32B 2439/06* (2013.01); *B32B 2553/026* (2013.01); *Y10T 156/10* (2015.01); *Y10T 428/24942* (2015.01); *Y10T 428/249921* (2015.04)

(58) Field of Classification Search
CPC ............... B65D 81/3897; D05B 13/00; Y10T 428/24942; Y10T 156/10; Y10T 428/249921; Y10T 2007/0004
See application file for complete search history.

(56) References Cited

U.S. PATENT DOCUMENTS

| | | | |
|---|---|---|---|
| 2,716,558 A | 8/1955 | Sullivan | |
| 3,142,599 A | 7/1964 | Chavannes | |
| 3,294,387 A * | 12/1966 | Chavannes | B29C 66/45 267/145 |
| 3,577,305 A * | 5/1971 | Hines et al. | A41D 13/0155 2/243.1 |
| 3,868,056 A * | 2/1975 | Keren | B65D 31/02 206/521 |
| 4,658,452 A * | 4/1987 | Brockhaus | A47C 7/02 5/420 |
| 4,679,242 A * | 7/1987 | Brockhaus | A45C 3/04 190/1 |
| 4,737,994 A * | 4/1988 | Galton | A41D 13/0155 2/465 |
| 4,934,654 A | 6/1990 | Linnemann | |
| 5,639,523 A * | 6/1997 | Ellis | B65D 5/4216 206/484 |
| 5,709,477 A | 1/1998 | Schinasi et al. | |
| 5,855,978 A | 1/1999 | Handwerker | |
| 5,904,230 A * | 5/1999 | Peterson | A45C 11/20 190/107 |
| 7,303,076 B2 * | 12/2007 | Scalise | A23B 7/00 206/521.2 |
| 8,387,789 B2 * | 3/2013 | Baker | B63B 35/7946 206/315.1 |
| 8,936,172 B2 * | 1/2015 | Hicks | A45C 3/00 220/592.03 |
| 2004/0265521 A1 | 12/2004 | Marzano | |
| 2005/0095419 A1 * | 5/2005 | Raeburn | B32B 27/12 428/319.1 |
| 2006/0078234 A1 | 4/2006 | Chandra et al. | |
| 2006/0198562 A1 * | 9/2006 | Mogil | A45C 7/0077 383/121.1 |
| 2007/0082158 A1 | 4/2007 | Nowak | |
| 2008/0187252 A1 * | 8/2008 | Dabrazzi | A45C 3/04 383/12 |
| 2009/0020199 A1 * | 1/2009 | McAleese | B65D 85/64 150/158 |
| 2011/0268375 A1 | 11/2011 | Schinasi | |
| 2014/0150937 A1 * | 6/2014 | Favalora, III | B60J 11/04 150/166 |

FOREIGN PATENT DOCUMENTS

| | | |
|---|---|---|
| EP | 0753467 A1 | 1/1997 |
| FR | 2127507 | 9/1972 |
| GB | 1374257 | 11/1971 |
| GB | 2274085 A | 7/1994 |
| GB | 2316653 A | 3/1998 |
| GB | 2322844 A | 9/1998 |
| GB | 2346078 A | 8/2000 |
| JP | 3574319 U | 10/1993 |
| JP | 3910478 A | 4/1997 |
| JP | 2003210285 A | 7/2003 |
| JP | 4261301 | 4/2009 |
| WO | 2010150160 A1 | 12/2010 |

* cited by examiner

METHOD FOR PREPARING PIECES OF FABRIC; PIECES AND BAG DERIVED FROM APPLICATION OF THE METHOD

CROSS REFERENCE TO RELATED APPLICATIONS

The present application claims the priority of the prior Swiss application CH 02252/12 filed on 5 Nov. 2012 in the name of CODEFINE S.A., the contents of this prior application being incorporated by reference in its entirety in the present application.

FIELD OF INVENTION

The present invention concerns a method for preparing constituent pieces of fabric of a bag of synthetic fabric for the purpose of stiffening the walls of the bag and giving the latter more stability; the present invention also concerns the pieces and bag derived from application of the method.

BACKGROUND

Bags of synthetic fabric comprising a base and four vertical sides, in general two long sides and two short sides, are well known, the document EP0691286 (B1) can be cited by way of simple reference, but a multitude of documents could easily be cited.

In theory, or when they are drawn on paper, these bags stand up perfectly, their sides are properly vertical and taut and the mouth of the bag remains open and properly deployed to receive what one wishes to transport in the bag.

In practice, the sides of a real bag are much less obedient than on paper such that they tend to lean over, then to lie towards the interior of the bag, sometimes candling with their counterpart in the manner of a parachute which fails to open properly, but in all cases this results in the mouth of the bag closing in a more or less surreptitious manner.

Who has not had this experience that, having to hold an object or a load with both hands (a shovelful of sand or an armful of dead leaves) so as to place it into a bag, one does not manage to open the mouth of the bag and one is reduced to asking for the assistance of another person to hold the bag open.

Of course, the major difference between a bag and a rigid box is that the bag can be easily folded, that the space which it occupies once folded is minimal in comparison with its deployed effective volume, and that it remains infinitely lighter than a rigid container. It is not a question of abandoning these traditional advantages of the bag by having recourse to some form of internal or external chassis to remedy the above-mentioned disadvantages. The exercise wishes for the improvement to result exclusively from a modification of the properties of the pieces of fabric, even their arrangement.

SUMMARY

The present invention has the aim of proposing a method for producing pieces of fabric, in particular intended to constitute the vertical sides of a bag, such that, once produced by means of said pieces, the finished bag has a distinctly more pronounced tendency than hitherto to stand up whilst it is empty and to keep a shape such that essentially its mouth remains open. Finally, the present invention also aims to propose pieces of fabric produced according to the method, whatever the ultimate purpose of the pieces, and finally a bag having the properties of stability which are given to it by its constituent elements produced according to the method.

As often concerning objects or constructions having little technical sophistication, the solution comes from the marriage of two components which nothing predestines to combine with one another, the second component originating from another technical field and playing a different role there with other functions.

In the present case, the borrowing relates to bubble wrap, which is well known and universally used for wrapping up fragile objects, the air-filled bubbles carried by the film having the function of absorbing and cushioning shocks and thus preserving objects enveloped by means of the bubble wrap.

In its most pared-down version, the method according to the invention consists in assembling two individual pieces of synthetic fabric, for example of polypropylene, and a bubble wrap sandwiched between the said pieces, the assembly being realized by coating with adhesive, or not, of one of the faces of the piece of fabric, then insertion and bonding (where applicable) of a piece of bubble wrap, the dimensions of which are in relation (preferably non-identical) to those of the piece of fabric. The two individual pieces of fabric are assembled by sewing, laminating or bonding for example or by other equivalent methods.

The smooth side or the bumpy side of the bubble wrap can be applied against the piece of fabric coated with adhesive when one of the faces of one of the pieces of fabric is coated with adhesive. One or other of the ways does not lead to an absolutely identical result, the bonding by the bumpy face giving the unit a slightly greater rigidity.

One can choose to retain, or not, the coating with adhesive mentioned above and, if applicable, to implement it on both sides of the bubble wrap or on a single side.

It can be a nuisance to allow the bubble wrap to extend up to the very edge of the pieces of fabric, because the film and the bubbles then interfere in a zone where the sewing of the pieces of fabric with one another is to take place for constructing the bag. It will therefore be preferred to leave a blank on the periphery of the pieces of fabric and therefore to associate each piece of fabric with a piece of bubble wrap, the dimensions of which (for example the width and/or the height) are slightly less than those of the piece of fabric.

The difference of the respective dimensions of the individual pieces of fabric and of the piece of bubble wrap offers a margin of manoeuvre. In fact, the more marked this difference in dimensions is, the easier the folding of the bag along its edges will be. The more this difference is reduced, the more the stability of the bag will be potentially great. A good compromise must be found as a function of the bubble wrap itself and of the characteristics of the fabric, in particular its grammage.

In the manner of execution of the "sandwich", one of the pieces of fabric, the one which will occupy an external position, will be charged with providing the solidity of the bag, whereas the second piece of fabric will only serve to trap the bubble wrap and can therefore be selected with a lower grammage than that of the piece of fabric intended for the exterior.

The trapping of the bubble wrap between the two pieces of fabric can also be realized by laminating of one piece of fabric on the other.

Finally, there is nothing to prohibit using two pieces of fabric of identical grammage, and therefore of having recourse to flattened sections of tubular fabric, and in the interior of which the bubble wrap is disposed, as when placing one's hand in a sock. The use of tubular fabric, the cost of which is less, can therefore be favoured, if one wishes.

As was recalled at the outset in the introduction, folding is a fundamental aspect in the bag industry. In the majority of cases, the folding of a bag occurs at least in part along its edges, i.e. along the lines of shared sewing by which the base and the four sides of the bag are sewn to one another. However, very frequently folding lines are impressed elsewhere than along the edges, in particular when the short sides and the base are articulated on folding along a gusset, which can be oriented either towards the interior of the bag, as for paper shopping bags, or towards the exterior of the bag.

The result of the method according to the invention, i.e. the association of at least two individual pieces of fabric with a bubble wrap for the purpose of constituting a side of a bag, presents a very spectacular advantage here. In fact, when a side which is realized in this manner is folded, for example along an oblique line starting from a lower corner and intended to form a gusset with the base, the marking of the fold in the double material (synthetic fabric and bubble wrap) gives rise to an unknown and new effect, namely that the folding line becomes a preferred deployment line with a spring effect. To illustrate: a traditional bag of fabric solely tends to sag onto itself along the folding lines which have been impressed on it. Conversely, a bag made with the fabric associated with the bubble wrap according to the invention will have a kind of preference for the deployment impressed in the material, or specifically in the divergences of behavior of the two parts which compose it.

Admittedly, the bag will not unfold itself and erect itself on its own solely under the effect of looking, but very noticeably, the bag tends to return to a kind of comfort position, which is deployed open and not folded closed. It is certainly an a priori unsuspected characteristic of the fabric-bubble wrap assembly, but it is particularly welcome with regard to the problem to which the invention endeavours to bring a solution and is therefore favourable for realizing the aim of the invention.

It is to be noted that the tandem arrangement of synthetic fabric-bubble wrap does not prevent the folding, that it only thickens the walls of the bag to a very small extent which is not cumbersome and finally that the additional weight is insignificant.

BRIEF DESCRIPTION OF THE DRAWINGS

Forms of embodiment of the invention are described below with reference to the drawings, in which.

DETAILED DESCRIPTION OF THE PREFERRED EMBODIMENTS

Figure 1:
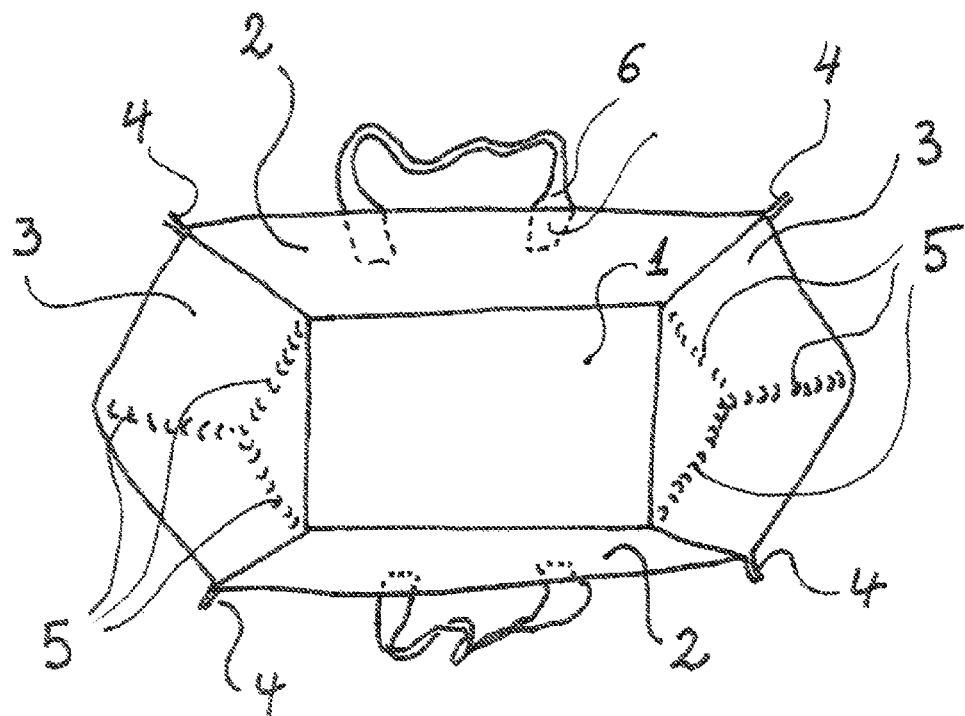
FIG. 1 is a bird's eye view, oriented downward, of the bag according to the invention.
Figure 2:
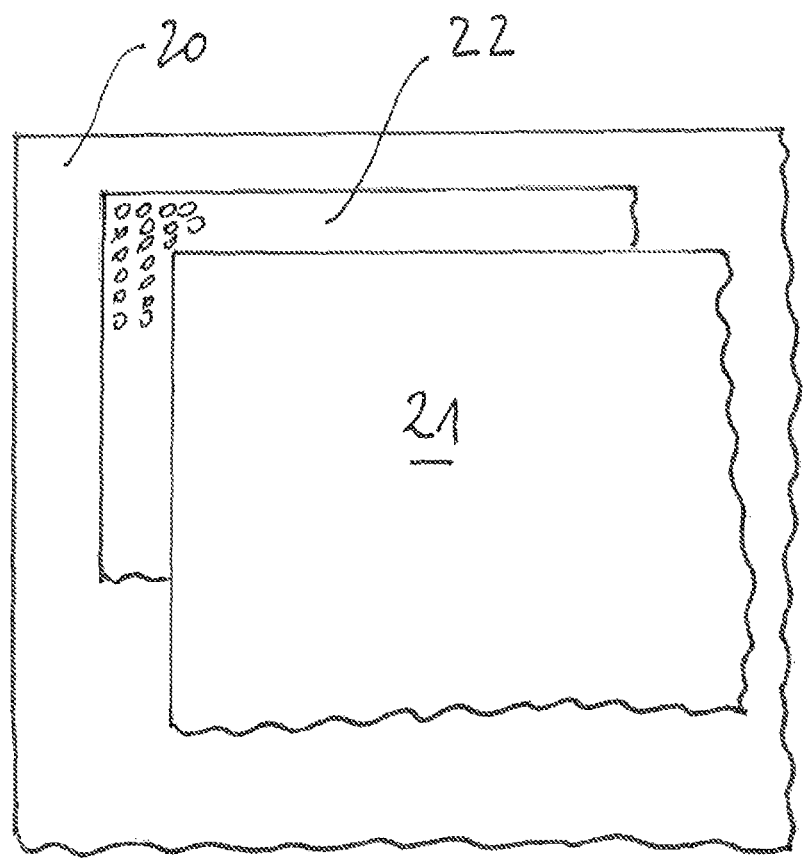
FIG. 2 is a partial view of the assembly of the pieces of fabric and bubble wrap.

In FIGS. 1 and 2, the base 1 of the bag, and also two vertical long sides 2 and two vertical short sides 3 can be seen. The four sides are realized by means of two pieces of synthetic fabric 20, 21 (FIG. 2), for example of polypropylene, which are each secured to four pieces of bubble wrap 22 (FIG. 2). The vertical edges of the pieces of fabric of the four sides are sewn 4 to one another by their common vertical edges and are also sewn on the base 1 in the same manner. The gusset folding lines 5 which are marked in the pieces of fabric of the short sides 3 are to be seen.

Finally, it is noted that handles of synthetic braid 6 are sewn 7 close to the upper end of the two long sides 2 of the bag.

Looking at FIG. 1, it is clear that owing to the gusset folding of the bag, the short sides remain slightly pinched towards the exterior, giving the mouth of the bag a slightly hexagonal shape.

It should be specified that FIG. 1 is realized from a photograph of an actual bag which is standing straight upright on its own and properly open. The figure therefore makes no appeal at all to artistic effect in the drawing, this is truly what is obtained by constructing the bag according to the method.

In FIG. 2, an embodiment of the invention has been illustrated with assembly of the elements forming a wall (2 or 3) of the bag. Thus, each wall includes two individual pieces of fabric 20, 21, between which a bubble wrap 22 is placed. Preferably, the dimension of the film 22 is less than that of the pieces 20, 21, to permit the assembly of the two individual fabric pieces 20, 21 one to the other as described above.

Figure 3:
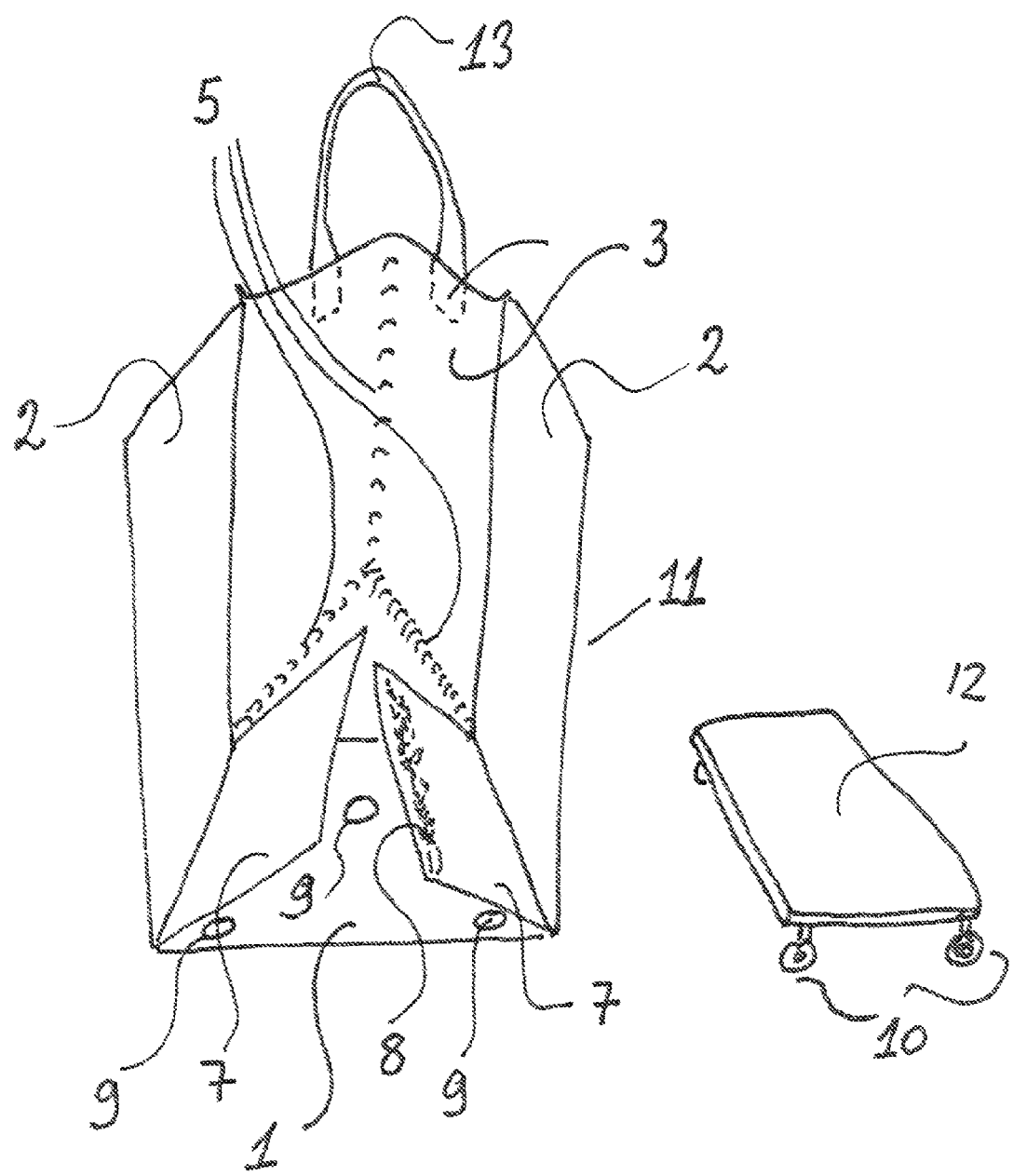
FIG. 3 is a partially truncated bird's eye view of the bag according to the invention.

In FIG. 3, the bag 11 is to be seen and also its two long sides 2. The gusset folding lines 5 can also be seen, appearing in the short sides 3 (a single one of which is represented in the figure). What changes with respect to FIG. 1 is essentially the base, which receives an arrangement permitting the bag to be rolled on the ground.

This arrangement consists in the addition of two pocketbook flaps 7, of synthetic fabric, sewn along the common edges between the base 1 and the long sides 2. Each of the two flaps carries an attachment member (hook and loop mat) 8, so that they can be placed in cooperation one with the other. Also, in the base 1 of the bag, holes can be seen forming apertures, the number and position of which permit the wheels 10, fixed beneath a plate 12, to be passed through them.

The plate 12 is preferably made of alveolar polypropylene (honeycomb) for the properties of rigidity, solidity and lightness of this material.

When one wishes to fit the plate 12 to the base 1, the two flaps 7 are folded back and the wheels 10 are introduced in the holes 9 until the plate rests on the fabric of the base. Then the two flaps 7 are lowered and the plate is locked against the base by pressing the members 8 one against the other.

Finally, it is noted that a handle 13 is fixed on at least one short side 3 such that the user can pull behind him the rolling bag according to the second variant of the bag according to the invention.

Owing to the properties of the various pieces of fabric secured to pieces of bubble wrap, which result from the method according to the invention, a bag is obtained which remains truly upright and open, the more if it is mounted on rollers as in the second variant, because the plate also plays a stabilizing role. By achieving its aim so well, the bag according to the invention opens up new horizons for use, for example in shopping centres and superstores. Unlike the traditional shopping trolley, the customer can take and load the filled bag directly into the boot of his car.

The embodiments of the invention are given by way of illustrative examples and must not be considered as being restrictive. Variations are possible within the claimed scope of protection, in particular by having recourse to equivalent means.

By way of example of variants, it can be envisaged to propose more complex pieces of fabric including not only two pieces of fabric and one sandwiched bubble wrap, but more than one bubble wrap between the two pieces of fabric, or an assembly of three pieces of fabric and two bubble wraps, these elements being placed in an alternating manner. In such a case, the difference pieces of fabric can have the same grammage, or not, and the bubble wraps can have the same construction (density, size, shape of bubbles), or not. The choice can be made as a function of the application, the circumstances or the desired properties of the object (for example of the bag) which is to be manufactured.

The invention claimed is:

1. A method for the production of a bag comprising sides including one or more pieces of fabric, the method comprising:
   providing a first piece of fabric as an outer wall of the side of the bag;
   affixing a second piece of fabric to the first piece of fabric, the second piece of fabric affixed as an inner wall of the side of the bag, and the second piece of fabric having a lower grammage than the first piece of fabric;
   placing at least one piece of bubble wrap between said first and second pieces of fabric so as to sandwich the piece of bubble wrap between the first and second pieces of fabric, wherein a first side of the bubble wrap directly abuts a first side of the first piece of fabric and wherein a second side of the bubble wrap directly abuts a first side of the second piece of fabric, and wherein the bubble wrap is dimensionally smaller than either the first piece of fabric or the second piece of fabric; and
   providing a base disposed at the bottom of the bag, wherein the base includes a plate, and rollers fixed beneath the plate, said rollers cooperate with holes or apertures formed in the base, and the plate being held against the base by two flaps collaborating by an attachment member.

2. The method according to claim 1, wherein the affixing includes sewing, laminating or bonding the first piece of fabric to the second piece of fabric along one or more edges of each piece of fabric.

3. The method according to claim 1, further comprising bonding the first side of the bubble to the first side of the first piece of fabric and bonding the second side of the bubble wrap to the first side of the second piece of fabric.

4. A bag, comprising:
   sides, including:
      a first piece of fabric as an outer wall of each side of the bag;
      a second piece of fabric affixed to the first piece of fabric as an inner wall of each side of the bag, wherein the second piece of fabric has a lower grammage than the first piece of fabric; and
      at least one piece of bubble wrap between said first and second pieces of fabric so as to sandwich the piece of bubble wrap between the first and second pieces of fabric, wherein a first side of the bubble wrap directly abuts a first side of the first piece of fabric and wherein a second side of the bubble wrap directly abuts a first side of the second piece of fabric, and wherein the bubble wrap is dimensionally smaller than either the first piece of fabric or the second piece of fabric; and
   a base disposed at the bottom of the bag, wherein the base includes a plate, and rollers fixed beneath the plate, said rollers cooperate with holes or apertures formed in the base, and the plate being held against the base by two flaps collaborating by an attachment member.

* * * * *